United States Patent [19]
Ikeda

[11] Patent Number: 5,715,218
[45] Date of Patent: Feb. 3, 1998

[54] PICKUP CONTROL METHOD AND APPARATUS, AND DISK UNIT WITH GAIN CONTROL DURING POWER SAVE MODE

[75] Inventor: Toru Ikeda, Kawasaki, Japan

[73] Assignee: Fujitsu Limited, Kawasaki, Japan

[21] Appl. No.: 640,185

[22] Filed: Apr. 30, 1996

[30] Foreign Application Priority Data

Aug. 3, 1995 [JP] Japan ................... 7-198591

[51] Int. Cl.$^6$ .................................. G11B 7/085
[52] U.S. Cl. ................. 369/44.29; 369/44.35; 369/44.27
[58] Field of Search .............. 369/44.29, 44.35, 369/44.36, 44.28, 54, 44.31, 44.27

[56] References Cited

U.S. PATENT DOCUMENTS

| | | | |
|---|---|---|---|
| 5,150,345 | 9/1992 | Shikichi et al. | 369/44.36 |
| 5,532,991 | 7/1996 | Sasaki | 369/44.35 |
| 5,612,939 | 3/1997 | Ueki et al. | 369/54 |

FOREIGN PATENT DOCUMENTS

| | | |
|---|---|---|
| 3-194732 | 8/1991 | Japan . |
| 4-289524 | 10/1992 | Japan . |
| 4-345925 | 12/1992 | Japan . |
| 5-144025 | 6/1993 | Japan . |
| 5-242507 | 6/1993 | Japan . |

*Primary Examiner*—Thang V. Tran
*Attorney, Agent, or Firm*—Greer, Burns & Crain, Ltd.

[57] ABSTRACT

A pickup control method is used to control a pickup of a reproducing unit which reproduces information from a recording medium. The pickup control method includes the steps of (a) controlling a gain of a tracking error signal in a tracking servo system during a power save mode of the reproducing unit so that the gain is reduced in the power save mode in which the reproducing unit operates at a reduced power consumption compared to a normal operation mode, where the tracking servo system controls tracking of the pickup based on the tracking error signal so that the pickup follows a track on the recording medium, and (b) controlling a phase characteristic of a phase compensation means, provided in the tracking servo system, for compensating a phase of the tracking error signal so as to secure a phase margin at a zero-crossing point of the gain in an open loop characteristic of the tracking servo system during the power save mode.

22 Claims, 11 Drawing Sheets

FIG. 8

| STATE OF POWER SAVE MODE | CONTENT | SWITCHING TIME |
|---|---|---|
| ……… | READ STATE | ……… |
| 1 | STOP READ AMP, STOP BIAS CURRENT, SERVO GAIN→LOW | 2 SECONDS |
| 2 | SERVO OFF, LASER DIODE OFF | 22 MINUTES |
| 3 | STOP SPINDLE MOTOR | 33 MINUTES |
| … | | |

PICKUP CONTROL METHOD AND APPARATUS, AND DISK UNIT WITH GAIN CONTROL DURING POWER SAVE MODE

BACKGROUND OF THE INVENTION

The present invention generally relates to pickup control methods and apparatuses and disk units, and more particularly to a pickup control method and a pickup control apparatus which carry out stable tracking servo and focus servo, and to a disk unit having such a pickup control apparatus.

FIG. 1 is a system block diagram showing an example of a conventional optical disk unit. In FIG. 1, a laser beam emitted from a laser diode (LD) 101 of an optical head 100 is irradiated on an optical disk 103 which is rotated by a spindle motor 102. The laser beam reflected by the optical disk 103 is converted into an electrical signal by a photodetector 104 within the optical head 100. A laser diode (LD) control circuit 105 controls the laser diode 101 so that the laser beam is emitted with an optimum light emission power for each mode, based on a gate signal for the write, erase or read mode received from a host unit (not shown).

A reproducing circuit 106 separates the frequency bands of the electrical signal which is output from the photodetector 104 of the optical head 100, and supplies a high-frequency component signal to a radio frequency (RF) signal generating circuit (not shown) so as to reproduce data. On the other hand, a low-frequency component signal from the reproducing circuit 106 is supplied to a tracking servo system 107 and a focus servo system 108. The tracking servo system 107 generates a tracking error signal based on the low-frequency component signal, and this tracking error signal is supplied to the optical head 100 so as to carry out a tracking servo. In addition, the focus servo system 108 generates a focus error signal based on the low-frequency component signal, and this focus error signal is supplied to the optical head 100 so as to carry out a focus servo.

The gain of the tracking servo system 107 is not always maintained constant. More particularly, the gain of the tracking servo system 107 is different between a normal operation mode in which an access is made with respect to the optical disk 103 and a power save mode in which no access is made to the optical disk 103 and the power consumption of the optical disk unit is reduced, for example. In other words, in the power save mode, an accurate tracking servo such as that required in the normal operation mode is unnecessary in the power save mode because no access is made to the optical disk 103 in the power save mode, however, it is still necessary to carry out the tracking servo. If no tracking servo were carried out in the power save mode, it is impossible to positively carry out the tracking at a high speed when the operation mode is switched from the power save mode to the normal operation mode. Hence, in the power save mode, the gain of the tracking servo system 107 is set to a value smaller than that used in the normal operation mode.

Similarly, the gain of the focus servo system 108 is not always maintained constant. More particularly, the gain of the focus servo system 108 different between the normal operation mode in which an access is made with respect to the optical disk 103 and the power save mode in which no access is made to the optical disk 103. In other words, in the power save mode, an accurate focus servo such as that required in the normal operation mode is unnecessary in the power save mode because no access is made to the optical disk 103 in the power save mode, however, it is still necessary to carry out the focus servo. If no focus servo were carried out in the power save mode, it is impossible to positively carry out the focusing at a high speed when the operation mode is switched from the power save mode to the normal operation mode. Hence, in the power save mode, the gain of the focus servo system 108 is set to a value smaller than that used in the normal operation mode.

For example, Japanese Laid-Open Patent Applications No. 4-345925 and No. 5-242507 propose methods of reducing the gain of the focus servo system when the tracking servo system is turned OFF. In addition, a Japanese Laid-Open Patent Application No. 4-289524 proposes a method of increasing the gain of the tracking servo system when the tracking servo system is switched from an OFF state to an ON state so as to make an access to the optical disk. However, these Japanese Laid-Open Patent Applications do not disclose a means for realizing stable tracking servo and/or focus servo and a reduced power consumption even when the gain of the tracking servo system and/or focus servo system is reduced in an operation mode such as the power save mode in which no access is made to the optical disk.

The tracking servo system 107 and the focus servo system 108 respectively have a gain adjusting circuit which adjusts the gain of the servo loop and a phase compensation circuit which compensates for the phase characteristic. FIGS. 2A and 2B are diagrams showing examples of the characteristics of the tracking servo system 107. FIG. 2A shows the open loop characteristic of the tracking servo system 107, and FIG. 2B shows the combined phase characteristic of the gain adjusting circuit and the phase compensation circuit within the tracking servo system 107 and the gain characteristic of the gain adjusting circuit. In FIGS. 2A and 2B, the abscissa indicates the frequency, and the ordinate indicates the value of the gain and the angle of the phase. As shown in FIG. 2A, when the gain adjusting circuit has a gain G in the open loop characteristic, a zero-crossing point of the gain G occurs at a frequency $f_H$, and a phase characteristic $\Theta$ has a phase margin $\Theta_m$ at this frequency $f_H$.

However, when the operation mode of the optical disk unit is switched from the normal operation mode to the power save mode and the gain of the gain adjusting circuit is switched from $G_c$ to $G_c'$ as shown in FIG. 2B, the zero-crossing point of a gain G' of the gain adjusting circuit in the open loop characteristic shown in FIG. 2A shifts to a frequency $f_L$, because the characteristic of the phase compensation circuit is fixed and the combined phase characteristic $\Theta_c$ is thus fixed as shown in FIG. 2B. As a result, the phase margin of the phase characteristic $\Theta$ decreases to $\Theta_m'$ at the frequency $f_L$ as shown in FIG. 2A. When the phase margin $\Theta_m'$ decreases as shown in FIG. 2A, the stability of the tracking servo deteriorates, and the tracking servo easily falls outside the controllable range in response to external disturbances. In an extreme case, an oscillation occurs in the tracking servo, thereby considerably increasing the power consumption.

In addition, problems similar to those encountered in the tracking servo were also generated in the case of the focus servo.

Therefore, there conventionally was no method of realizing stable tracking servo and focus servo and a low power consumption in an operation mode such as the power save mode in which no access is made to the optical disk.

SUMMARY OF THE INVENTION

Accordingly, it is a general object of the present invention to provide a novel and useful pickup control method, pickup control apparatus and disk unit, in which the problems described above are eliminated.

Another and more specific object of the present invention is to provide a pickup control method, a pickup control apparatus and a disk unit which enable a stable servo operation while maintaining a sufficient phase margin in a phase characteristic of an open loop characteristic of a tracking servo system and/or focus servo system.

Still another object of the present invention is to provide a pickup control method for controlling a pickup of a reproducing unit which reproduces information from a recording medium, comprising the steps of (a) controlling a gain of a tracking error signal in a tracking servo system during a power save mode of the reproducing unit so that the gain is reduced in the power save mode in which the reproducing unit operates at a reduced power consumption compared to a normal operation mode, the tracking servo system controlling tracking of the pickup based on the tracking error signal so that the pickup follows a track on the recording medium, and (b) controlling a phase characteristic of a phase compensation means, provided in the tracking servo system, for compensating a phase of the tracking error signal so as to secure a phase margin at a zero-crossing point of the gain in an open loop characteristic of the tracking servo system during the power save mode. According to the pickup control method of the present invention, it is possible to maintain a phase margin in the phase characteristic of an open loop characteristic of the tracking servo system even when the operation mode of the reproducing unit is switched from the normal operation mode to the power save mode, thereby making it possible to realize a stable tracking servo operation.

A further object of the present invention is to provide a pickup control method for controlling a pickup of a reproducing unit which reproduces information from a recording medium by use of a light beam, comprising the steps of (a) controlling a gain of a focus error signal in a focus servo system during a power save mode of the reproducing unit so that the gain is reduced in the power save mode in which the reproducing unit operates at a reduced power consumption compared to a normal operation mode, the focus servo system controlling focus of the pickup based on the focus error signal so that the light beam is focused at a track position on the recording medium, and (b) controlling a phase characteristic of a first phase compensation means, provided in the focus servo system, for compensating a phase of the focus error signal so as to secure a phase margin at a zero-crossing point of the gain in an open loop characteristic of the focus servo system during the power save mode. According to the pickup control method of the present invention, it is possible to maintain a phase margin in the phase characteristic of an open loop characteristic of the focus servo system even when the operation mode of the reproducing unit is switched from the normal operation mode to the power save mode, thereby making it possible to realize a stable focus servo operation.

Another object of the present invention is to provide the pickup control method described immediately above, which further comprises the steps of (c) controlling a gain of a tracking error signal in a tracking servo system during the power save mode of the reproducing unit so that the gain is reduced in the power save mode, the tracking servo system controlling tracking of the pickup based on the tracking error signal so that the pickup follows a track on the recording medium, and (d) controlling a phase characteristic of a second phase compensation means, provided in the tracking servo system, for compensating a phase of the tracking error signal so as to secure a phase margin at a zero-crossing point of the gain in an open loop characteristic of the tracking servo system during the power save mode. According to the pickup control method of the present invention, it is possible to maintain a phase margin in the phase characteristic of an open loop characteristic of the tracking servo system even when the operation mode of the reproducing unit is switched from the normal operation mode to the power save mode, thereby making it possible to also realize a stable tracking servo operation.

Still another object of the present invention is to provide a pickup control apparatus for controlling a pickup of a reproducing unit which reproduces information from a recording medium, comprising a tracking servo system controlling tracking of the pickup based on a tracking error signal so that the pickup follows a track on the recording medium, gain adjusting means, provided in the tracking servo system, for adjusting a gain of the tracking error signal, means for controlling the gain of the gain adjusting means so that the gain is switched between a normal operation mode and a power save mode of the reproducing unit, the reproducing unit in the power save mode operating at a reduced power consumption compared to the normal operation mode, phase compensation means, provided in the tracking servo system, for compensating a phase of an output of the gain adjusting means, and phase characteristic control means for controlling a phase characteristic of the phase compensation means so that the phase characteristic is switched between the normal operation mode and the power save mode. According to the pickup control apparatus of the present invention, it is possible to maintain a phase margin in the phase characteristic of an open loop characteristic of the tracking servo system even when the operation mode of the reproducing unit is switched from the normal operation mode to the power save mode, thereby making it possible to realize a stable tracking servo operation.

A further object of the present invention is to provide a pickup control apparatus for controlling a pickup of a reproducing unit which reproduces information from a recording medium by use of a light beam, comprising a focus servo system controlling focus of the pickup based on a focus error signal so that the light beam is focused at a track position on the recording medium, first gain adjusting means, provided in the focus servo system, for adjusting a gain of the focus error signal, means for controlling the gain of the first gain adjusting means so that the gain is switched between a normal operation mode and a power save mode of the reproducing unit, the reproducing unit in the power save mode operating at a reduced power consumption compared to the normal operation mode, first phase compensation means, provided in the focus servo system, for compensating a phase of an output of the first gain adjusting means, and first control means for controlling a phase characteristic of the first phase compensation means so that the phase characteristic is switched between the normal operation mode and the power save mode. According to the pickup control apparatus of the present invention, it is possible to maintain a phase margin in the phase characteristic of an open loop characteristic of the focus servo system even when the operation mode of the reproducing unit is switched from the normal operation mode to the power save mode, thereby making it possible to realize a stable focus servo operation.

Another object of the present invention is to provide the pickup control apparatus described immediately above, which further comprises a tracking servo system controlling tracking of the pickup based on a tracking error signal so that the pickup follows a track on the recording medium, second gain adjusting means, provided in the tracking servo system, for adjusting a gain of the tracking error signal, means for controlling the gain of the second gain adjusting means so that the gain is switched between the normal operation mode and the power save mode of the reproducing unit, second phase compensation means, provided in the tracking servo system, for compensating a phase of an output of the second gain adjusting means, and second control means for controlling a phase characteristic of the second phase compensation means so that the phase characteristic is switched between the normal operation mode and the power save mode. According to the pickup control apparatus of the present invention, it is possible to maintain a phase margin in the phase characteristic of an open loop characteristic of the tracking servo system even when the operation mode of the reproducing unit is switched from the normal operation mode to the power save mode, thereby making it possible to also realize a stable tracking servo operation.

Still another object of the present invention is to provide a disk unit comprising a pickup reproducing information from a disk, a tracking servo system controlling tracking of the pickup based on a tracking error signal so that the pickup follows a track on the disk, gain adjusting means, provided in the tracking servo system, for adjusting a gain of the tracking error signal, means for controlling the gain of the gain adjusting means so that the gain is switched between a normal operation mode and a power save mode of the disk unit, the disk unit in the power save mode operating at a reduced power consumption compared to the normal operation mode, phase compensation means, provided in the tracking servo system, for compensating a phase of an output of the gain adjusting means, and phase characteristic control means for controlling a phase characteristic of the phase compensation means so that the phase characteristic is switched between the normal operation mode and the power save mode, and for maintaining a phase margin at a zero-crossing point of the gain in an open loop characteristic of the tracking servo system during the power save mode. According to the disk unit of the present invention, it is possible to maintain a phase margin in the phase character- istic of an open loop characteristic of the tracking servo system even when the operation mode of the reproducing unit is switched from the normal operation mode to the power save mode, thereby making it possible to realize a stable tracking servo operation.

A further object of the present invention is to provide a disk unit comprising a pickup reproducing information from a disk using a light beam, a focus servo system controlling focus of the pickup based on a focus error signal so that the light beam is focused at a track position on the disk, first gain adjusting means, provided in the focus servo system, for adjusting a gain of the focus error signal, means for controlling the gain of the first gain adjusting means so that the gain is switched between a normal operation mode and a power save mode of the disk unit, the disk unit in the power save mode operating at a reduced power consumption compared to the normal operation mode, first phase compensation means, provided in the focus servo system, for compensating a phase of an output of the first gain adjusting means, and first control means for controlling a phase characteristic of the first phase compensation means so that the phase characteristic is switched between the normal operation mode and the power save mode, and for maintaining a phase margin at a zero-crossing point of the gain in an open loop characteristic of the focus servo system during the power save mode. According to the disk unit of the present invention, it is possible to maintain a phase margin in the phase characteristic of an open loop characteristic of the focus servo system even when the operation mode of the reproducing unit is switched from the normal operation mode to the power save mode, thereby making it possible to realize a stable focus servo operation.

Another object of the present invention is to provide the disk unit described immediately above, which further comprises a tracking servo system controlling tracking of the pickup based on a tracking error signal so that the pickup follows a track on the disk, second gain adjusting means, provided in the tracking servo system, for adjusting a gain of the tracking error signal, means for controlling the gain of the second gain adjusting means so that the gain is switched between the normal operation mode and the power save mode of the disk unit, second phase compensation means, provided in the tracking servo system, for compensating a phase of an output of the second gain adjusting means, and second control means for controlling a phase characteristic of the second phase compensation means so that the phase characteristic is switched between the normal operation mode and the power save mode, and for maintaining a phase margin at a zero-crossing point of the gain in an open loop characteristic of the tracking servo system during the power save mode. According to the disk unit of the present invention, it is possible to maintain a phase margin in the phase characteristic of an open loop characteristic of the tracking servo system even when the operation mode of the reproducing unit is switched from the normal operation mode to the power Save mode, thereby making it possible to also realize a stable tracking servo operation.

Other objects and further features of the present invention will be apparent from the following detailed description when read in conjunction with the accompanying drawings.

BRIEF DESCRIPTION OF THE DRAWINGS

FIG. 8 is a diagram for explaining states of a power save mode;

DESCRIPTION OF THE PREFERRED EMBODIMENTS

First, a description will be given of the general construction of an embodiment of a disk unit according to the present invention, by referring to FIG. 3. In this embodiment, the present invention is applied to an optical disk unit. This embodiment of the disk unit employs an embodiment of a pickup control method and apparatus according to the present invention.

Figure 1:
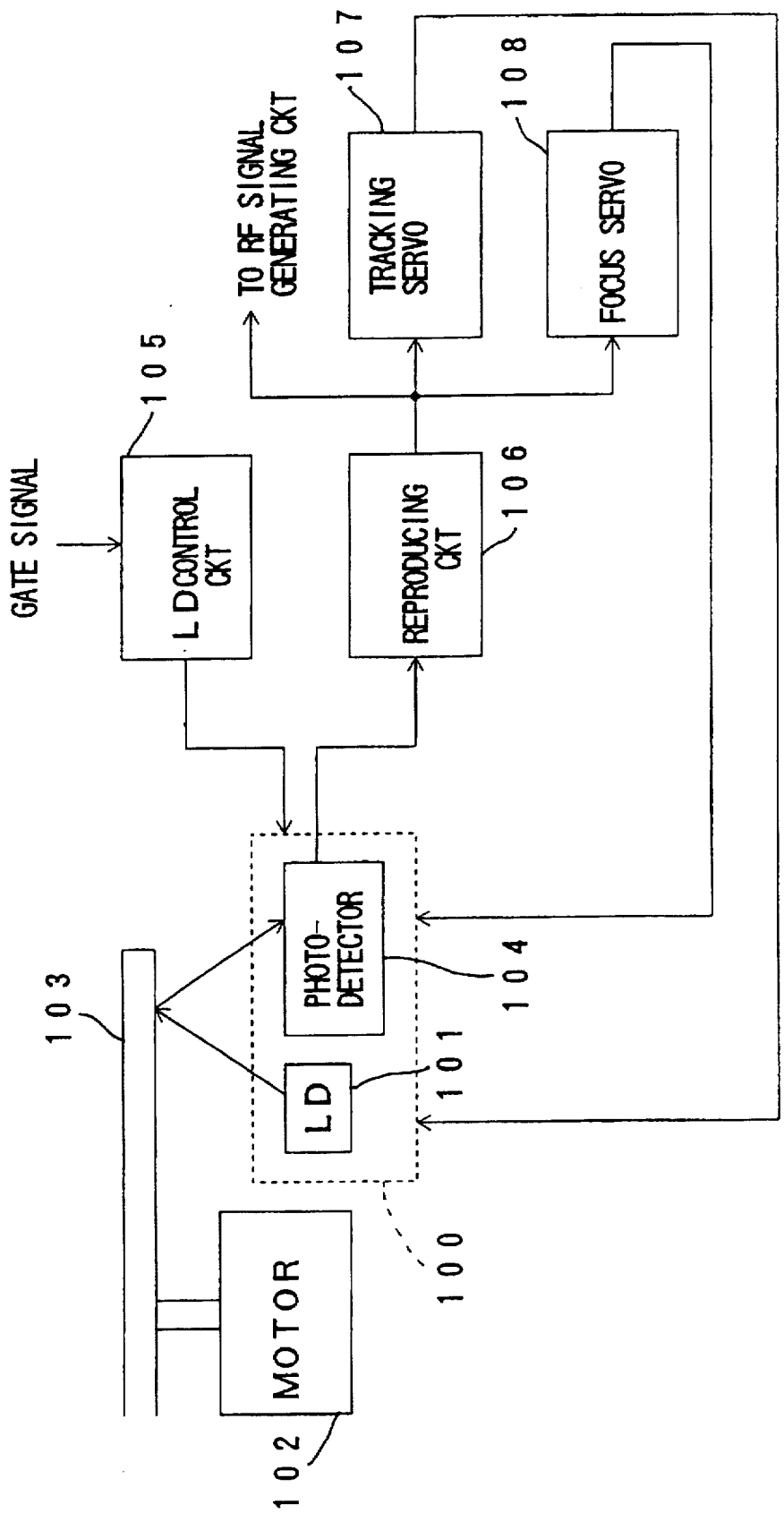
FIG. 1 is a system block diagram showing an example of a conventional optical disk unit.
Figures 2A, 2B:
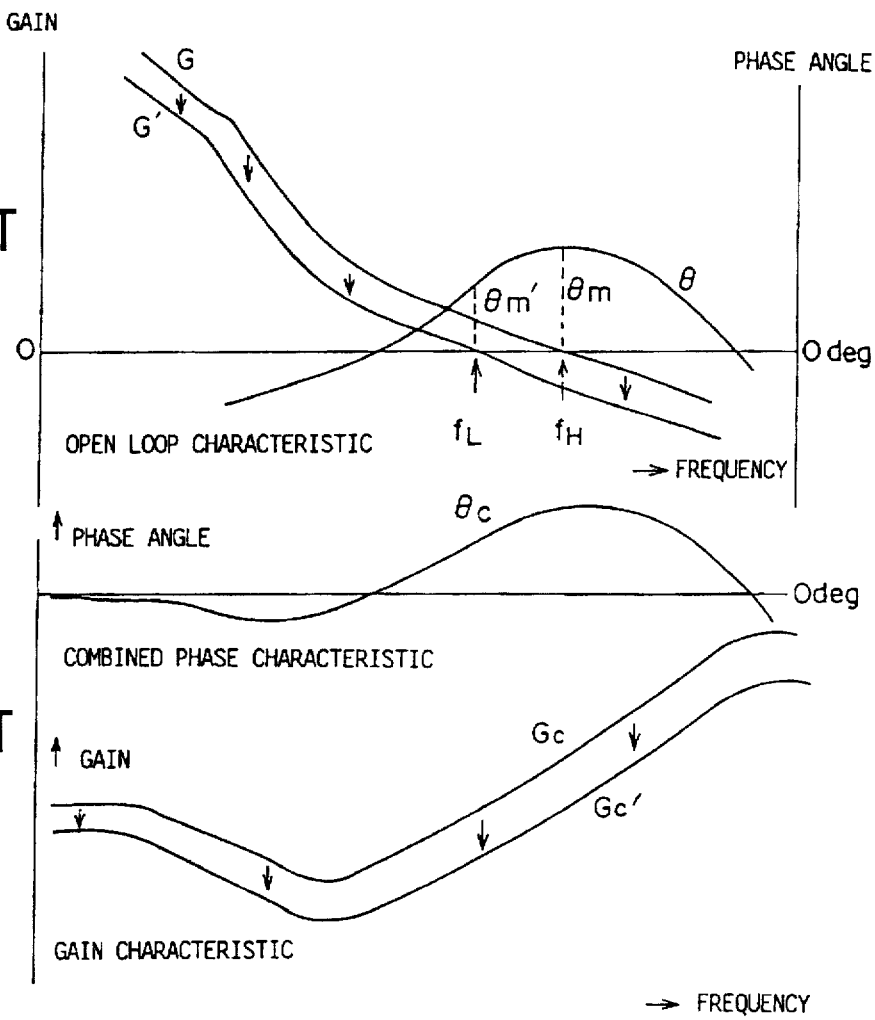
FIGS. 2A and 2B respectively are diagrams showing examples of the characteristics of the conventional tracking servo system.
Figure 3:
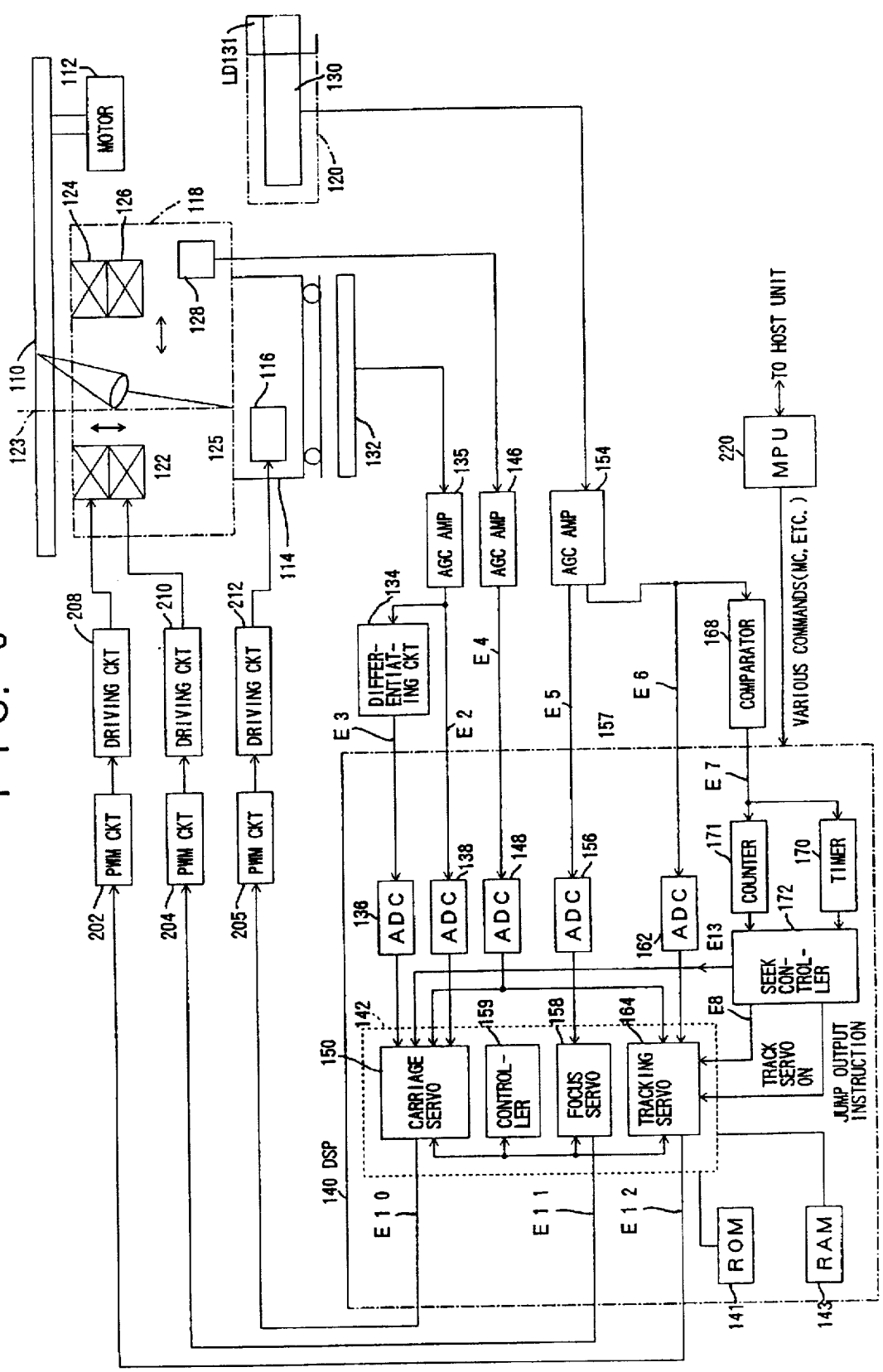
FIG. 3 is a system block diagram showing the general construction of an embodiment of a disk unit according to the present invention.

In FIG. 3, information can be written optically on and read optically from an optical disk 110. For example, this optical disk 111 is accommodated within a cartridge (not shown). When the cartridge accommodating the optical disk 110 is loaded into the optical disk unit, a loading mechanism (not shown) engages the optical disk 110 to a rotary shaft of a spindle motor 112. The spindle motor 112 rotates the optical disk 110 at a constant speed.

A carriage 114 is arranged freely movable in a radial direction of the optical disk 110. A movable head part 118 is mounted on the carriage 114. The carriage 114 is moved in the radial direction of the optical disk 111 by a carriage driving coil 116. More particularly, a voice coil motor is used as the carriage driving coil 116.

An objective lens 122 is provided on the movable head part 118 of the carriage 114. The objective lens 122 converges a laser beam which is emitted from a laser diode (light source) 131 of a stationary head part 120 so as to form a beam spot onto a surface of the optical disk 110. This objective lens 122 is driven by a lens actuator 125 provided with a track actuator driving coil 124, and the beam spot is moved in the radial direction of the optical disk 110 when the objective lens 122 is driven by the lens actuator 125. The lens actuator 125 is also referred to as a track actuator.

For example, a moving range of the beam spot movable by the objective lens 122 is 32 tracks to one side from a lens center 123. In addition, the objective lens 122 is moved in a direction parallel to an optical axis by a focus actuator driving coil 126, thereby carrying out a focus servo which forms a predetermined beam spot on the surface of the optical disk 110.

A lens position sensor 128 is also provided on the movable head part 118. The lens position sensor 128 detects a position of the objective lens 122. In other words, a lens position signal E4 obtained from an automatic gain control (AGC) amplifier 146 is 0 V when the objective lens 122 is at a lens center position 123. The lens position signal E4 becomes a positive polarity signal voltage depending on a moving quantity of the objective lens 122 when the objective lens 122 moves towards the inner side of the optical disk 110, and becomes a negative polarity signal voltage depending on the moving quantity of the objective lens 122 when the objective lens 122 moves towards the outer side of the optical disk 110.

A position of the carriage 114 is detected by a carriage position sensor 132. A carriage position signal from the carriage position sensor 132 is supplied to an AGC amplifier 135. A carriage position signal E2 output from the AGC amplifier 135 becomes 0 V when the carriage 114 is located at an innermost position relative to the optical disk 110, and becomes a signal voltage which increases proportionally as the carriage 114 moves towards the outer side of the optical disk 110.

A laser receiving part 130 provided on the stationary optical head part 120 receives a returning light of the beam spot which is formed on the optical disk 110 by the objective lens 122. A light reception signal from the laser receiving part 130 is supplied to an AGC amplifier 154, and this AGC amplifier 154 outputs a focus error signal E5 and a tracking error signal E6. Of course, a laser light source for emitting a laser beam with respect to the movable head part 118 is provided on the stationary head part 120. The focus error signal E5 is supplied to a focus servo part 158 via an analog-to-digital converter (ADC) 156. An instruction data signal E11 output from the focus servo part 158 is supplied to the focus actuator driving coil 126 via a digital-to-analog (DAC, not shown) of the DSP 140, a pulse width modulation (PWM) circuit 204 and a driving circuit 210.

A digital signal processor (DSP) 140 is provided to control the carriage 114, the track actuator driving coil 124 and the focus actuator driving coil 126. The DSP 140 includes ADCs and DACs (not shown), and for example, a DSP MB86311 manufactured by Fujitsu Limited of Japan may be used as the DSP 140. Each of the circuit functions of a carriage servo part 150, the focus servo part 158, a tracking servo part 164 and a seek controller 172 is realized by a processor circuit part 142 of the DSP 140. Furthermore, a microprocessor unit (MPU) 220 is coupled to the DSP 140, and this MPU 220 notifies a seek command to the DSP 140 based on commands received from a host unit such as an external disk control unit.

The carriage servo part 150 carries out a double servo and a position lock control using the carriage 114. The carriage position signal E2 is output from the AGC amplifier 135 based on the output detection signal of the carriage position sensor 132, and the carriage position signal E2 is supplied to the carriage servo part 150 via an ADC 138 in order for the carriage servo part 150 to carry out the double servo and the position lock control. In addition, the carriage position signal E2 from the AGC amplifier 135 is differentiated in a differentiating circuit 134 so as to produce a carriage speed signal E3, and this carriage speed signal E3 is supplied to the carriage servo part 150 via an ADC 136.

A seek control carried out by the seek controller 172 can roughly be divided into a coarse control which includes an acceleration control, a constant speed control and a deceleration control of the carriage 114, and a fine control which positions the carriage 114 to a target track position. When carrying out the acceleration control of the coarse control, a predetermined acceleration current instruction data is output as a current instruction data signal E10 from the seek controller 172 via the carriage servo part 150, and the current instruction data signal E10 is supplied to the carriage driving coil 116 via the DAC of the DSP 140, a PWM circuit 206 and a driving circuit 212, so that a constant acceleration current is supplied to the carriage driving coil 116 until a target speed is reached.

When the acceleration control of the coarse control ends, the constant speed control is started. The coarse control includes a feedback control in which a counter 171 counts a tracking error signal (TES) zero-crossing signal E7 which is output from a comparator 168 for a predetermined time, the seek controller 172 compares the counted value with the target speed, and the current instruction data E10 is output via a DAC of the DSP 140 so that an error between the two compared values becomes zero.

The deceleration control of the coarse control is carried out when the carriage 114 reaches a position which is a predetermined number of tracks from the target track. According to the deceleration control, the counter 171 counts the TES zero-crossing signal E7 which is output from the comparator 168 for a predetermined time, the seek controller 172 compares the counted value with the target speed, and the deceleration is controlled so as to follow the linearly decreasing target speed depending on the remaining number of tracks to the target track, similarly as in the case of the constant speed control. When the carriage 114 is moved by the carriage servo part 150 and the beam spot approaches the target track, the final positioning is made by the lens actuator 125.

For example, when the remaining number of tracks to the target track becomes 32 tracks, the track actuator driving coil 124 is driven so that the seek control which drives the objective lens 122 is carried out in parallel. In other words, the seek control first moves the beam spot by driving the carriage 114, and positions the beam spot to the target track by driving the objective lens 122 by the track actuator driving coil 124 when the beam spot approaches the target track.

The tracking servo part 164 outputs a seek current and carries out an ON-track control by driving the track actuator driving coil 124. The seek primarily made by use of the lens actuator 125 is carried out when the number of tracks to the target cylinder is 32 tracks or less towards the inner or outer side of the optical disk 110. In this state, the carriage servo part 150 carries out a position servo control. For this reason, with respect to the movement of the lens actuator 125, the carriage servo part 150 controls the position of the carriage 114 so that the carriage position signal E2 from the lens position sensor 128 always becomes zero. Such a position control is called a double servo.

The tracking error signal E6 which is based on the light reception signal output from the laser light receiving part 130 is supplied from the AGC amplifier 154 to the tracking servo part 164 via an ADC 162. In addition, the tracking error signal E6 is also supplied to the comparator 168, and the comparator 168 outputs the TES zero-crossing signal E7 which indicates the zero-crossing timing of the tracking error signal E6. The zero-crossing signal E7 is supplied to the counter 171. Since one zero-crossing signal E7 is obtained every time one track is traversed (or crossed) by the beam spot, the seek controller 172 can recognize the number tracks traversed during the seek control based on the counted value from the counter 171.

In addition, the seek controller 172 can recognize a 1 track traversing time based on a generation period of the zero-crossing signal E7 output from the comparator 168, by measuring the generation period of the zero-crossing signal E7 in a timer 170. When the 1 track traversing time is obtained from the timer 170, the seek controller 172 can recognize the moving speed of the beam spot at that time, that is, the moving speed of the beam spot that is moved by the objective lens 122 driven by the track actuator driving coil 124.

A seek command which instructs a target track address is notified to the seek controller 172 from the host unit. The seek controller 172 obtains the remaining number of tracks to the target track address from a present track address which is recognized based on the zero-crossing signal E7, in response to the seek command. The seek control primarily made by use of the lens actuator 125 is carried out when the remaining number of tracks to the target track is 32 tracks or less. On the other hand, the seek control primarily made by use of the carriage 114 is carried out when the remaining number of tracks to the target track is more than 32 tracks.

The seek controller 172 stops outputting a tracking servo ON signal E8 simultaneously as when a track jump current output instruction is output, so as to turn OFF the ON-track control of the tracking servo part 164.

While the tracking servo part 164 receives the tracking servo ON signal E8 from the seek controller 172, the tracking servo part 164 outputs an instruction data signal E12 via a DAC of the DSP 140 so that the tracking error signal E6 received from the ADC 162 always becomes zero. Hence, the tracking servo part 164 carries out the ON-track control based on the tracking error signal E6 by driving the lens actuator coil 125 by the lens actuator 125 via a PWM circuit 202 and a driving circuit 208.

During the seek operation, the ON-track control is cancelled by stopping output of the tracking servo ON signal ES, and the seek operation is carried out based on the track jump current output instruction which is output simultaneously as the topping of the tracking servo ON signal ES. The seek control primarily made by use of the lens actuator 125 is also divided into a coarse control including an acceleration control, at constant speed control and a deceleration control, and a fine control, similarly as in the case of the seek control primarily made by use of the carriage 114.

A read only memory (ROM) 141 and a random access memory (RAM) 143 are also provided within the DSP 140.

Figure 4:
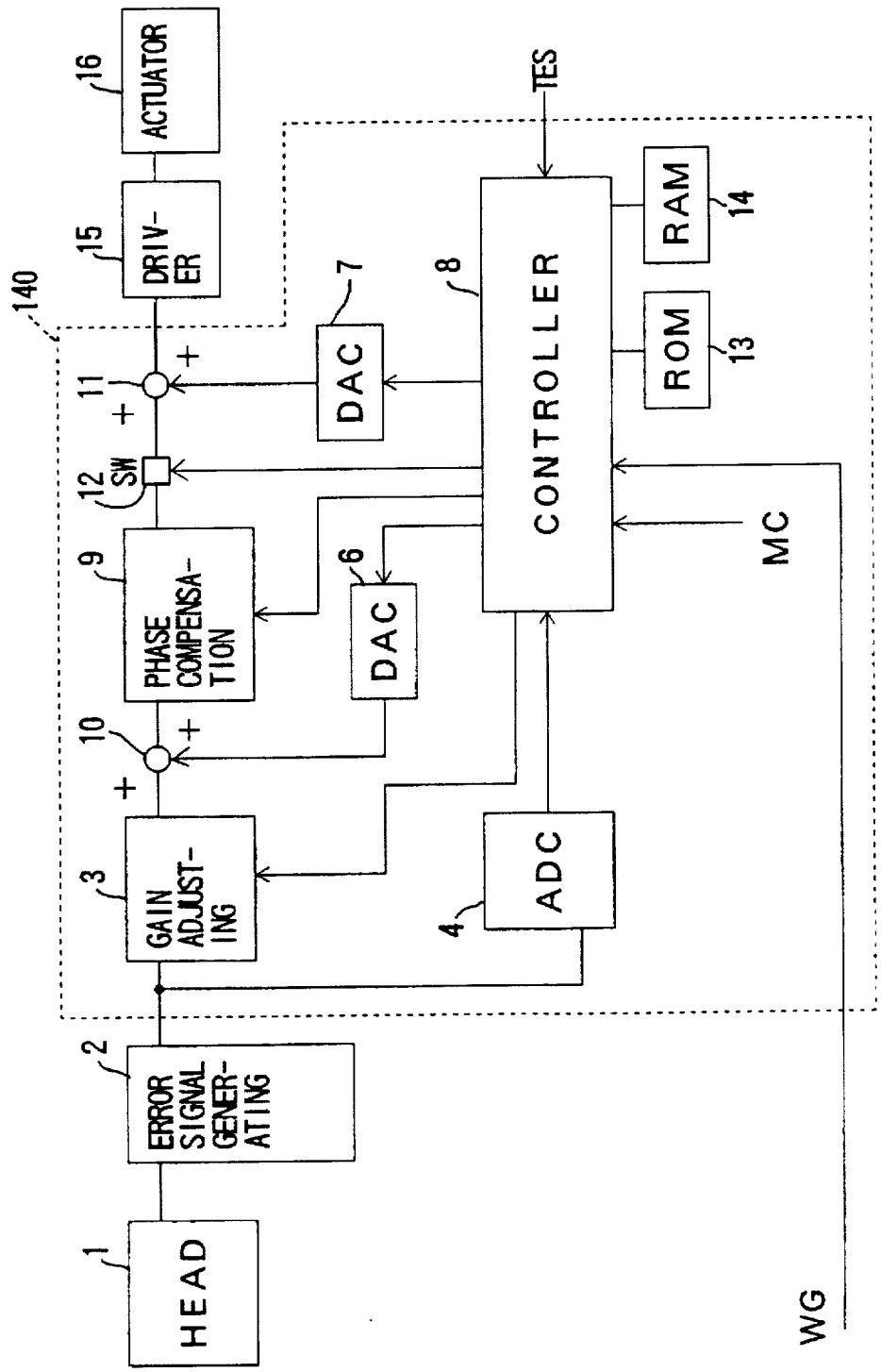
FIG. 4 is a system block diagram showing a part of the disk unit including a focus servo system.

FIG. 4 is a system block diagram showing a part of the embodiment of the disk unit according to the present invention. The part of the optical disk unit shown in FIG. 4 includes an optical head 1, an error signal generating circuit 2, a gain adjusting circuit 3, an analog-to-digital converter (ADC) 4, digital-to-analog converters (DACs) 6 and 7, a controller 8, a phase compensation circuit 9, adders 10 and 11, a switch 12, a ROM 13, a RAM 14, a driver 15, and a focus actuator 16 which are connected as shown.

In FIG. 4, the optical head 1 corresponds to the stationary head part 120 shown in FIG. 3. The error signal generating circuit 2 corresponds to the AGC amplifier 154 shown in FIG. 3, and the ADC 4 corresponds to the ADC 156. A part formed by the gain adjusting circuit 3, the DACs 6 and 7, the controller 8, the phase compensation circuit 9, the adders 10 and 11, and the switch 12 generally corresponds to the processor circuit part 142 within the DSP 140 shown in FIG. 3. The ROM 13 and the RAM 14 respectively correspond to the ROM 141 and the RAM 143. In addition, the driver 15 corresponds to the PWM circuit 204 and the driving circuit 210, and the focus actuator 16 corresponds to the focus actuator driving coil 126.

A signal reproduced from the optical disk (not shown) by the optical head 1 is supplied to the error signal generating circuit 2. This error signal generating circuit 2 includes an automatic gain control (AGC) circuit, and generates a focus error signal FES from the reproduced signal. The focus error signal FES is supplied to the gain adjusting circuit 3, and is also supplied to the controller 8 via the ADC 4. A gain of the gain adjusting circuit 3 is controlled by a control signal from the controller 8, so as to correct inconsistencies in the sensitivities of the individual optical heads 1. For example, the controller 8 is made up of a microcomputer, and receives a write gate signal WG, a mode set command MC, a tracking error signal TES and the like from the host unit (not shown). The write gate signal WG controls the light emission of the light source within the optical head 1 during the write/erase. In addition, the mode set command MC sets the operation mode of the optical disk unit, and specifies the normal operation mode, the power save mode and the like. The ROM 13 prestores programs and the like of various processes carried out by the controller 8. The RAM 14 stores various data and the like.

The adder 10 adds an output of the gain adjusting circuit 3 and an output (offset value) of the DAC 6, and supplies an added result to the phase compensation circuit 9. An output of the phase compensation circuit 9, which has been subjected to a phase compensation process, is supplied to the adder 11 via the switch 12. The adder 11 adds the output of the phase compensation circuit 9 obtained via the switch 12 and an output of the DAC 7, and supplies an added result to the driver 15. An output of the driver 15 is supplied to the focus actuator 16, and an optical system (not shown) of the optical head 1 is controlled so that the spot of the light emitted from the light source of the optical head 1 is formed at a desired position on the optical disk.

In a state where the focus servo is ON, the switch 12 is closed in response to a control signal from the controller 8. Thus, the output of the phase compensation circuit 9 is supplied to the adder 11, thereby forming a focus servo loop. In this state where the focus servo is ON, the DAC 7 is controlled by the controller 8 so as not to generate an output. Accordingly, when the focus servo is ON, the output of the adder 10 is supplied to the driver 15 via the phase compensation circuit 9, the switch 12 and the adder 11.

On the other hand, in a state where the focus servo is OFF, the switch 12 is open in response to a control signal from the controller 8, and no focus servo loop is formed. Hence, only the output of the DAC 7 is supplied to the adder 11. In this state where the focus servo is OFF, the controller 8 controls the focus actuator 16 so as to swing the focus actuator 16.

Therefore, when the focus servo is OFF, the output of the DAC 7 is supplied to the driver 15, so as to control the size of the spot formed on the optical disk by the operation of the focus actuator 16. In addition, the controller 8 detects an in-focus (or exact focus) position based on the output of the optical head 1.

In this embodiment, the controller 8 controls the gain adjusting circuit 3 so that the gain of the gain adjusting circuit 3 is set to a first value when the mode set command MC specifies the normal operation mode, and is set to a second value smaller than the first value when the mode set command MC specifies the power save mode. Further, the controller 8 controls the phase compensation circuit 9 so that so that the phase compensation characteristic of the phase compensation circuit 9 is set to a first characteristic when the mode set command MC specifies the normal operation mode, and is set to a second characteristic different from the first characteristic when the mode set command MC specifies the power save mode.

Figure 5A:
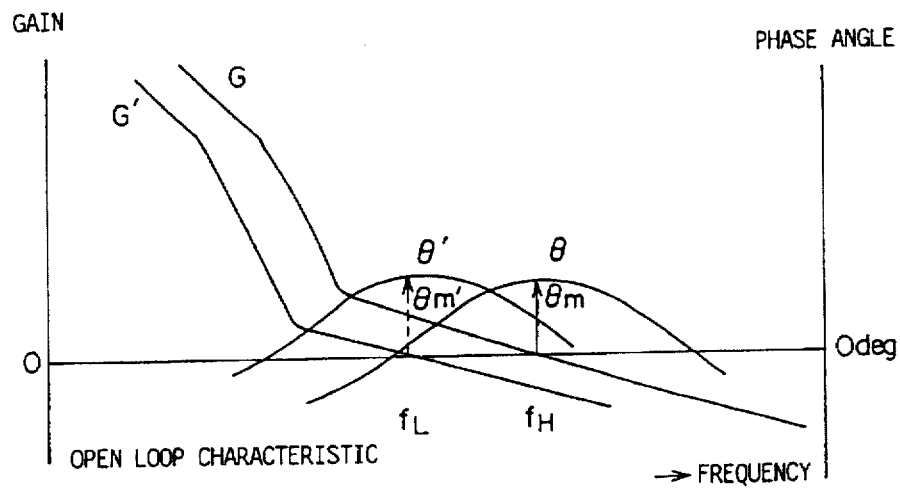
FIGS. 5A and 5B respectively are diagrams showing the characteristics of the focus servo system.
Figure 5B:
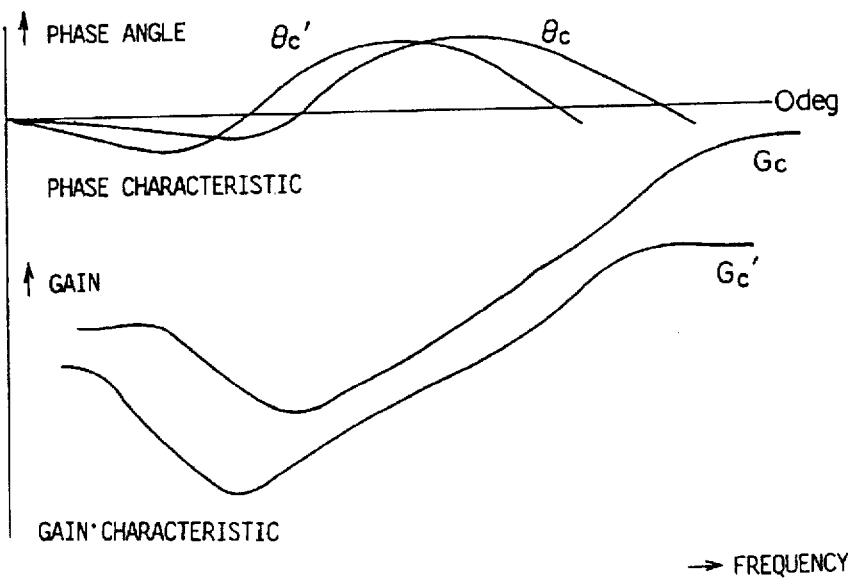

FIGS. 5A and 5B respectively are diagrams showing the characteristics of the focus servo system shown in FIG. 4. FIG. 5A shows the open loop characteristic of the focus servo system, and FIG. 5B shows the combined phase characteristic of the gain adjusting circuit 3 and the phase compensation circuit 9 within the focus servo system and the gain characteristic of the gain adjusting circuit. In FIGS. 5A and 5B, the abscissa indicates the frequency, and the ordinate indicates the value of the gain and the angle of the phase. As shown in FIG. 5A, when the gain adjusting circuit 3 has a gain G in the open loop characteristic, a zero-crossing point of the gain G occurs at a frequency $f_H$, and a phase characteristic $\Theta$ has a phase margin $\Theta_m$ at this frequency $f_H$.

On the other hand, when the operation mode of the optical disk unit is switched from the normal operation mode to the power save mode and the gain of the gain adjusting circuit 3 is switched from $G_c$ to $G_c'$ in FIG. 5B, the phase characteristic of the phase compensation circuit 9 changes from $\Theta$ to $\Theta'$ as shown in FIG. 5B. For this reason, the combined phase characteristic is also switched from $\Theta_c$ to $\Theta_c'$.

Accordingly, even when the zero-crossing point of the gain $G'$ of the gain adjusting circuit 3 shifts to a frequency $f_L$ in the open loop characteristic shown in FIG. 5A, the phase margin of the phase characteristic $\Theta'$ at this frequency $f_L$ is maintained to approximately $\Theta_m$, and it is possible to prevent the phase margin from becoming less than $\Theta_m$ as was the case of the conventional optical disk unit. For this reason, the stability of the focus servo is ensured, and it is possible to prevent the focus servo from easily falling outside the controllable range in response to external disturbances. It is also possible to positively prevent considerable increase in the power consumption caused by an oscillation generated in the focus servo system.

Figure 6:
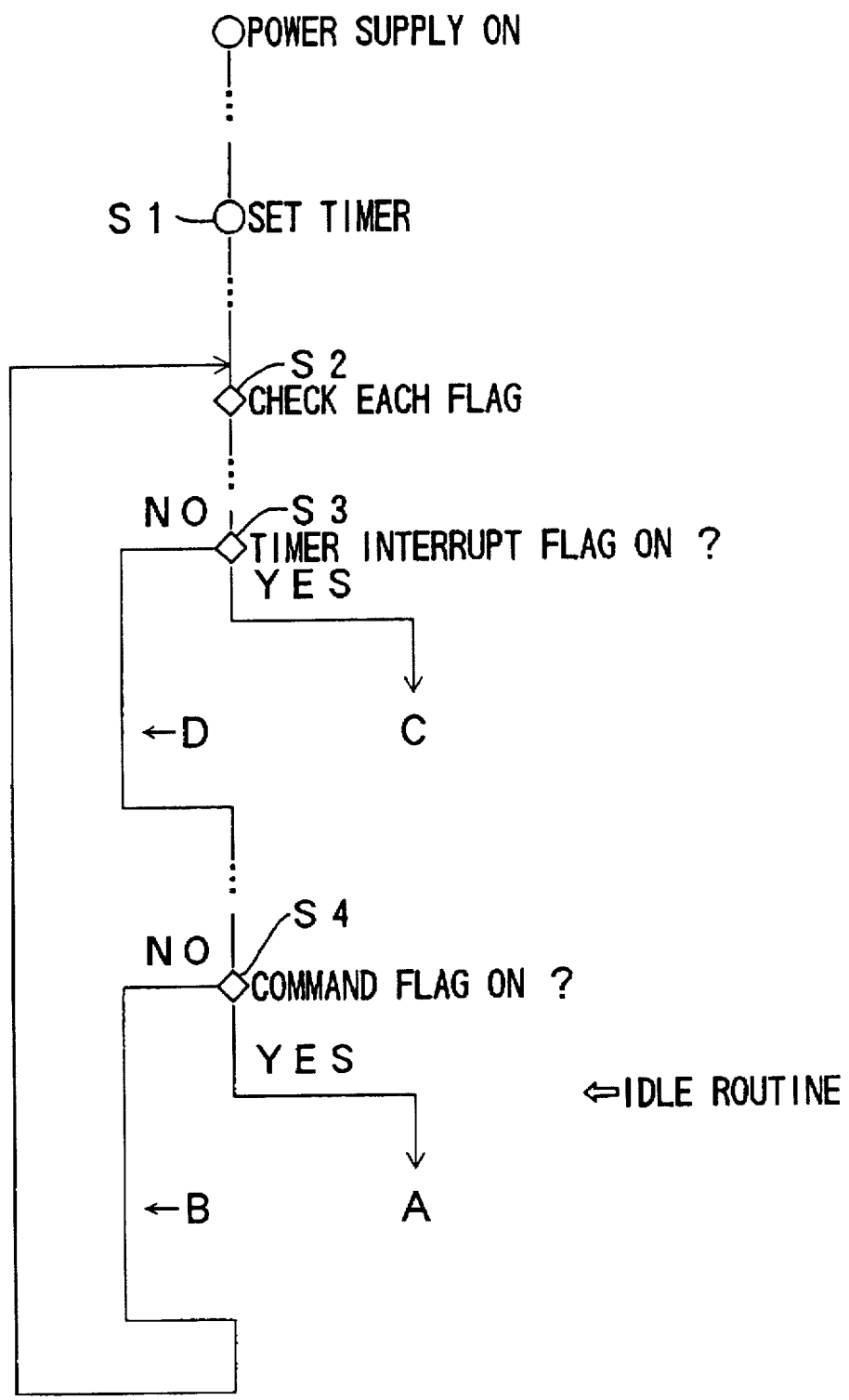
FIG. 6 is a flow chart for explaining an operation of a microprocessor unit.

FIG. 6 is a flow chart for explaining the operation of the MPU 220 shown in FIG. 3 in this embodiment. In FIG. 6, a step S1 sets an internal timer of the MPU 220, and a step S2 checks various flags including command flags related to commands from the host unit such as write and read commands, error flags and the like. A step S3 decides whether a timer interrupt flag is ON. When the timer interrupt is generated and the timer interrupt flag is turned ON (or set) by a timer interrupt process, the decision result in the step S3 is YES, and the process advances to a subroutine shown in FIG. 7.

Figure 7:
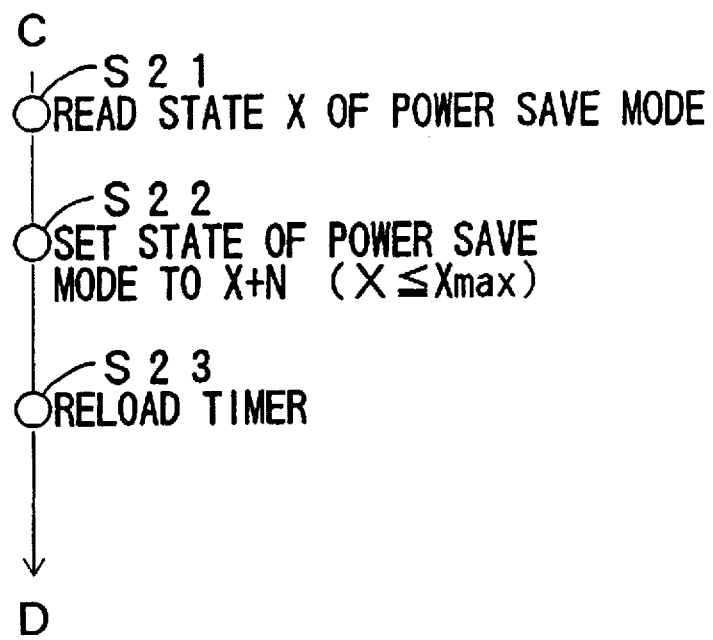
FIG. 7 is a flow chart for explaining a subroutine of the microprocessor unit.

In FIG. 7, a step S21 reads a state X of the power save mode, and a step S22 sets the state of the power save mode to X+N, where N is an arbitrary integer. In addition, a step S23 reloads the timer, and the process returns to a position D shown in FIG. 6.

The power save mode has a plurality of states as shown in FIG. 8. When the state of the power save mode is "1", the read amplifier within the error signal generating circuit 2 shown in FIG. 4 and the supply of a bias current are stopped, and the gain of the gain adjusting circuit 3 is set to the second value described above. The optical disk unit is automatically set to this state "1" of the power save mode when no access is made to the optical disk 110 for 2 seconds or more. In a state "2" of the power save mode, the focus servo of the focus servo system is turned OFF, and the laser diode 131 shown in FIG. 3 is turned OFF. The optical disk unit is automatically set to this state "2" of the power save mode when no access is made to the optical disk 110 for 22 minutes or more. In a state "3" of the power save mode, the spindle motor 112 shown in FIG. 3 is stopped. The optical disk unit is automatically set to this state "3" of the power save mode when no access is made to the optical disk 110 for 33 minutes or more. Of course, the active and inactive states of the various parts of the optical disk unit in the states of the power save mode are of course not limited to those shown in FIG. 8.

In other words, the power save mode has a plurality of levels, and as the level of the power save mode becomes higher, that is, as the value of the state of the power save mode in FIG. 8 becomes larger, the parts of the optical disk unit made inactive increases. In addition, as the time for which no access is made to the optical disk 110 becomes longer, the optical disk unit is automatically set to a higher level of the power save mode. In FIG. 7, the step S22 increases the level of the power save mode, and the level of the power save mode is incremented if N=1, for example.

Returning now to the description of FIG. 6, when the decision result in the step S3 is NO or after the step S23 in FIG. 7, a step S4 decides whether the command flag is ON. When an interrupt is generated by the command from the host unit and the command flag corresponding to the command interrupt process is ON, the decision result in the step S4 is YES, and the process advances to a step S31 shown in FIG. 9.

Figure 9:
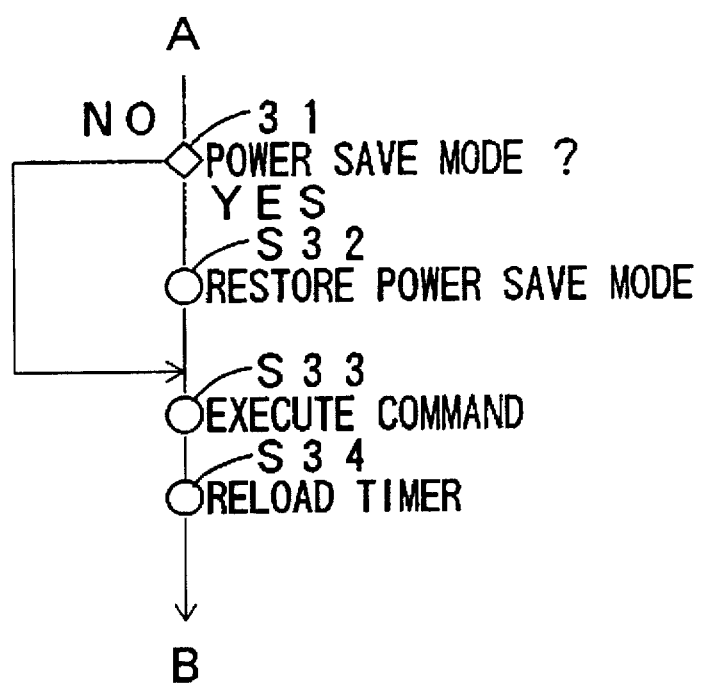
FIG. 9 is a flow chart for explaining a subroutine of the microprocessor unit.

In FIG. 9, the step S31 decides whether or not the operation mode of the optical disk unit is the power save mode. When the decision result in the step S31 is YES, a step S32 restores the power save mode. On the other hand, when the decision result in the step S31 is NO or after the step S32, a step S33 executes the command from the host unit. A step S34 reloads the timer, and the process returns to a position B shown in FIG. 6.

Accordingly, when the decision result in the step S4 shown in FIG. 6 is NO or after the step S34 shown in FIG. 9, the process returns to the step S2 shown in FIG. 6.

Figure 10:
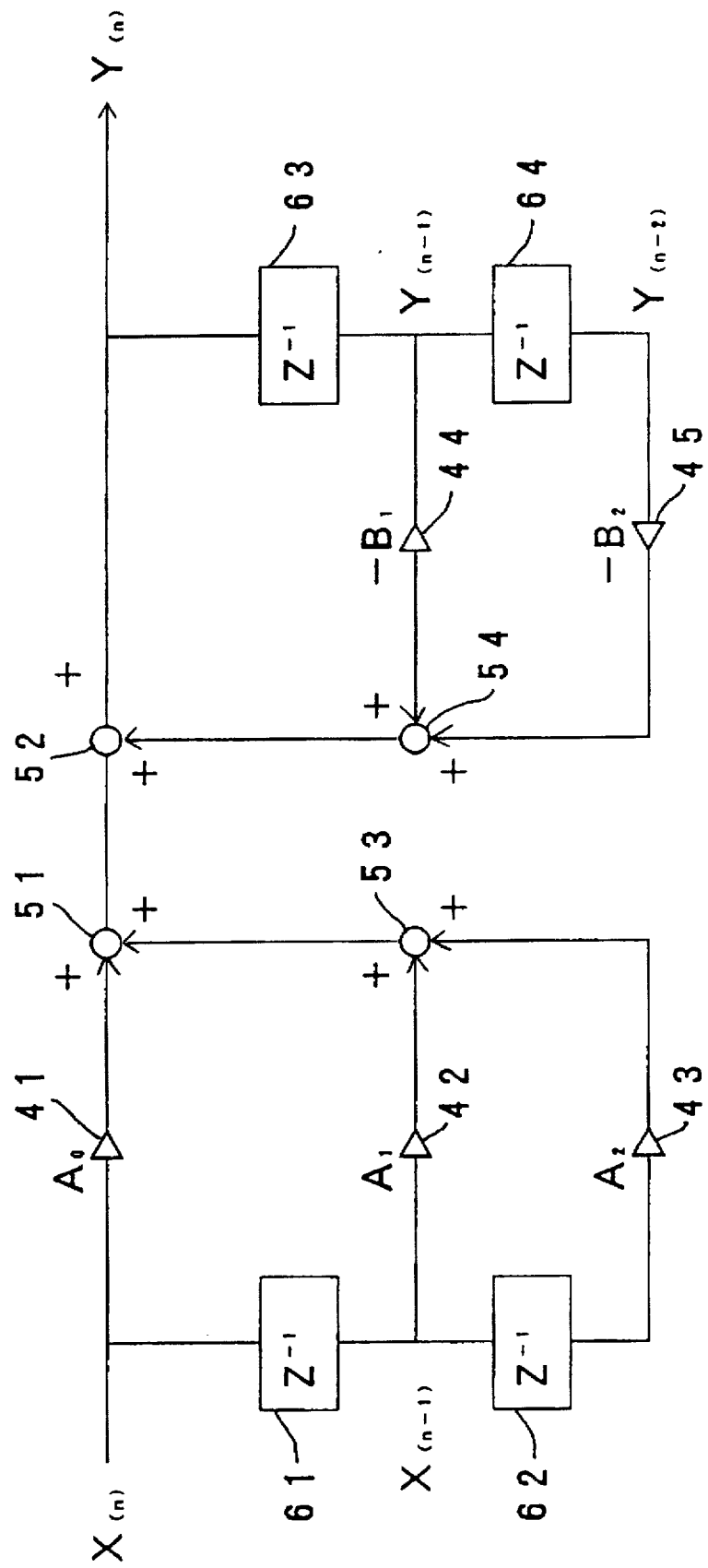
FIG. 10 is a system block diagram showing the construction of a digital filter.

FIG. 10 is a system block diagram showing the construction of a digital filter, to explain a case where the functions of the phase compensation circuit 9 shown in FIG. 4 is realized by providing the digital filter within the DSP 140 shown in FIG. 3. In other words, in order to maintain the sensitivity of the focus servo system constant, the phase is advanced or retarded by the digital filter to correct the phase error in the open loop characteristic that occurs when the gain of the gain adjusting circuit 3 shown in FIG. 4 is switched.

In FIG. 10, the digital filter includes multipliers 41 through 45 for respectively multiplying coefficients A0 through A2, B1 and B2, adders 51 through 54, and delay circuits 61 through 64 which are connected as shown. A transfer function G(z) of this second order digital filter can be described by the following formula, where A0 through A2, B1 and B2 are coefficients, X(n) is a present input value, X(n−1) is an input value of 1 sample before, Y(n) is a present output value, and Y(n−1) is an output value of 1 sample before.

$$G(z)=A0+A1Z^{-1}+A2Z^{-2})/(1+B1XZ^{-1}+B2Z^{-2})$$

The following formula can be obtained by transforming the above formula into a difference equation representation.

$$Y(n)=A0X(n)+A1X(n-1)+A2X(n-1)+A2X(n-2)-B1Y(n-1)-B2Y(n-2)$$

The above coefficients A0 through A2, B1 and B2 are stored in the RAM 14 shown in FIG. 4 for each operation mode of the optical disk unit. For example, the DSP 140 samples the output signal of the adder 10 at predetermined sampling time intervals, and supplies the output Y(n) which is obtained from the above formula based on the mode set command MC to the switch 12. When the operation mode of the optical disk unit is the normal operation mode, the DSP 140 calculates the output Y(n) by reading the values of the coefficients A0 through A2, B1 and B2 from the RAM 14 for setting the phase compensation characteristic of the digital filter to the first characteristic. In addition, when the operation mode of unit is the power unit is the power save mode, the DSP 140 calculates the output Y(n) by reading the values of the coefficients A0 through A2, B1 and B2 from the RAM 14 for setting the phase compensation characteristic of the digital filter to the second characteristic.

The values of the gains of the gain adjusting circuit 3 for each of the operation modes are known in advance. Hence, the DSP 140 may of course calculate the output Y(n) by sampling the output of the error signal generating circuit 2, that is, the output of the ADC 4 shown in FIG. 4, for example, at the above predetermined sampling time intervals, and reading values of the coefficients A0 through A2, B1 and B2 depending on the operation mode from the RAM 14. The calculation in this case may be carried out within the controller 8 shown in FIG. 4.

In order to simultaneously switch the value of the gain of the gain adjusting circuit 3 and switch the phase compensation characteristic of the phase compensation circuit 9 and to also control the open loop characteristic to a desired characteristic, the circuit control becomes slightly complicated due to the need to simultaneously control two circuits. Hence, in a modification of this embodiment, the gain of the gain adjusting circuit 3 is set to the same value for both the normal operation mode and the power save mode, and the gain and the phase compensation characteristic of the phase compensation circuit 9 are both controlled simultaneously. In this case, it is only necessary to control one circuit, thereby simplifying the circuit control and facilitating a more accurate control.

In other words, in the modification of this embodiment, the controller 8 controls the gain adjusting circuit 3 so that the gain of the gain adjusting circuit 3 is set to a third value when the mode set command MC specifies the normal operation mode, and the gain of the gain adjusting circuit 3 is also set to the third value when the mode set command MC specifies the power save mode. In addition, the controller 8 controls the phase compensation circuit 9 so that the phase compensation characteristic of the phase compensation circuit 9 is set to the first characteristic and the gain of the phase compensation circuit 9 is set to the first value when the mode set command MC specifies the normal operation mode, and the phase compensation characteristic of the phase compensation circuit 9 is set to a second phase compensation characteristic different from the first characteristic and the gain of the phase compensation circuit 9 is set to a second value smaller than the first value when the mode set command MC specifies the power save mode.

Figure 11:
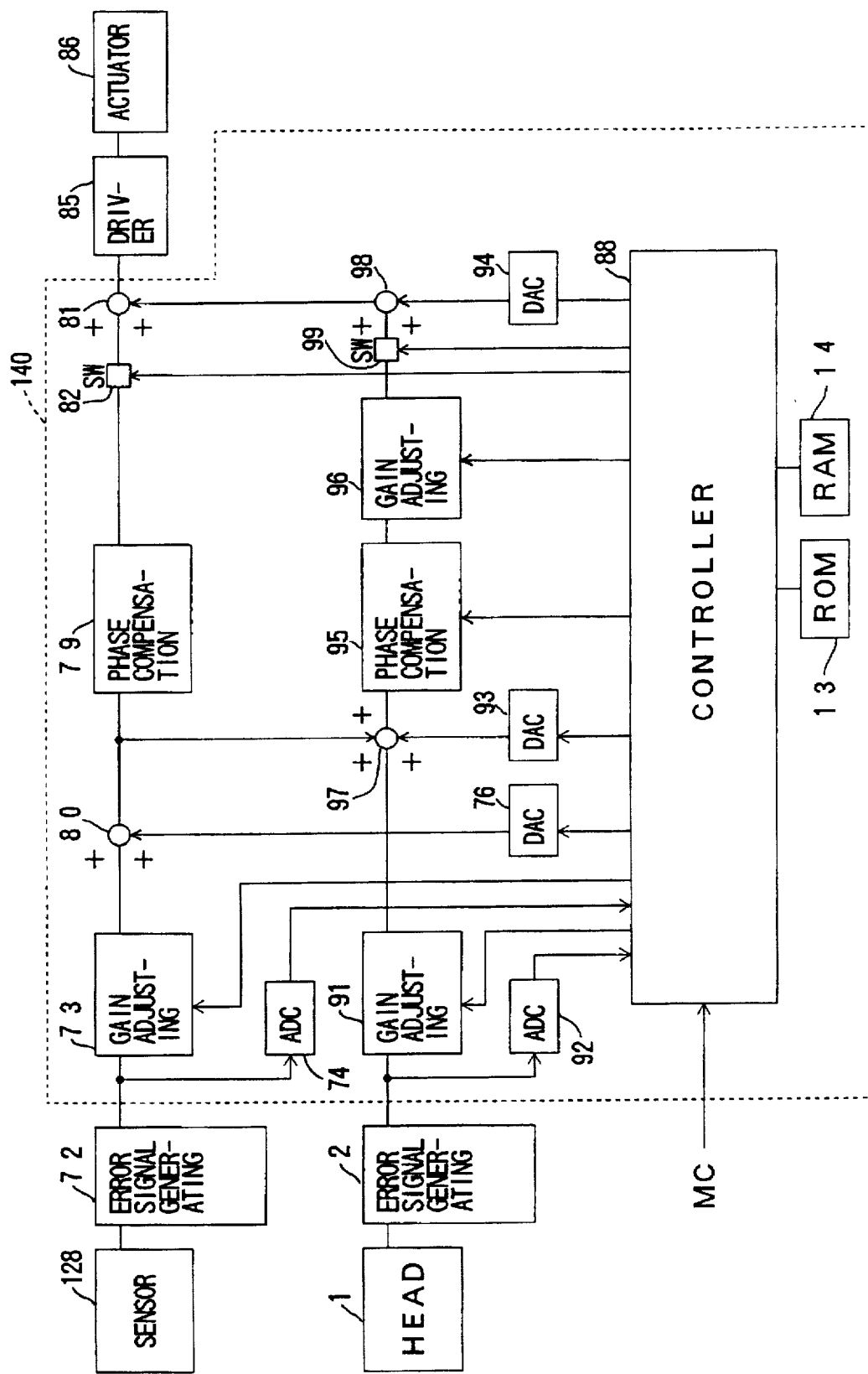
FIG. 11 is a system block diagram showing another part of the disk unit including a tracking servo system.

FIG. 11 is a system block diagram showing another part of the embodiment of the disk unit according to the present invention. In FIG. 11, those parts which are the same as those corresponding parts in FIGS. 3 and 4 are designated by the same reference numerals, and a description thereof will be omitted.

In FIG. 11, the optical disk unit includes the optical head 1, the lens position sensor 128, error signal generating circuits 2 and 72, gain adjusting circuits 73, 91 and 96, ADCs 74 and 92, DACs 76, 93 and 94, a controller 88, phase compensation circuits 79 and 95, adders 80, 81, 97 and 98, switches 82 and 99, the ROM 13, the RAM 14, a driver 85, and a tracking actuator 86 which are connected as shown.

The optical head 1 shown in FIG. 11 corresponds to the stationary head part 120 shown in FIG. 3. The error signal generating circuit 2 corresponds to the AGC amplifier 154 shown in FIG. 3, and the error signal generating circuit 72 corresponds to the AGC amplifier 146 shown in FIG. 3. The ADC 74 corresponds to the ADC 148, and the ADC 92 corresponds to the ADC 162. A part formed by the gain adjusting circuits 73, 91 and 96, the DACs 76, 93 and 94, the phase compensation circuits 79 and 95, the adders 80, 81, 97 and 98, the switches 82 and 99 and the controller 88 generally corresponds to the processor circuit part 142 within the DSP 140 shown in FIG. 3. The ROM 13 and the RAM 14 respectively correspond to the ROM 141 and the RAM 143. In addition, the driver 85 corresponds to the PWM circuit 202 and the driving circuit 208 shown i FIG. 3, and the tracking actuator 86 corresponds to the track actuator driving coil 124.

A signal reproduced from the optical disk (not shown) by the optical head 1 is supplied to the error signal generating circuit 2. The error signal generating circuit 2 includes an automatic gain control (AGC) circuit, and generates a tracking error signal TES from the reproduced signal. The tracking error signal TES is supplied to the gain adjusting circuit 91, and to the controller 88 via the ADC 92. The gain of the gain adjusting circuit 91 is controlled by a control signal from the controller 88, so as to correct inconsistencies in the sensitivities of the individual optical heads 1. For example, the controller 88 is made up of a microcomputer, and receives the mode set command MC and the like from the host unit (not shown). The mode set command MC sets the operation mode of the optical disk unit, and specifies the normal operation mode, the power save mode and the like. The ROM 13 prestores programs and the like of various processes carried out by the controller 88. The RAM 14 stores various data and the like.

On the other hand, the lens position signal obtained from the lens position sensor 28 is supplied to the error signal generating circuit 72. This error signal generating circuit 72 includes an AGC circuit, and generates a lens position error signal from the lens position signal. The lens position error signal is supplied to the gain adjusting circuit 73, and to the controller 88 via the ADC 74. The gain of the gain adjusting circuit 73 is controlled by a control signal from the controller 88, so as to correct inconsistencies in the sensitivities of the individual lens position sensors 128.

The adder 80 adds an output of the gain adjusting circuit 73 and an output (offset value) of the DAC 76, and supplies an added result to the phase compensation circuit 79. An output of the phase compensation circuit 79, which has been subjected to a phase compensation process, is supplied to the adder 81 via the switch 82. The adder 81 adds the output of the phase compensation circuit 79 obtained via the switch 82 and an output of the adder 98 which will be described later, and supplies an added result to the driver 85. The DAC 94 supplies to the adder 98 an output which is dependent on a specified value from the controller 88. An output of the driver 85 is supplied to the tracking actuator 86, and an optical system (objective lens and the like, not shown) of the optical head 1 is controlled so that the spot of the light emitted from the light source of the optical head 1 is formed at a desired position on the optical disk.

The adder 97 adds the output of the gain adjusting circuit 91, the output of the adder 80 and the output (offset value) of the DAC 93, and supplies an added result to the phase compensation circuit 95. An output of the phase compensation circuit 95, which has been subjected to a phase compensation process, is supplied to the adder 98 via the gain adjusting circuit 96 and the switch 99. The adder 98 adds the output of the phase compensation circuit 95 obtained via the gain adjusting circuit 96 and the switch 99 and the output of the DAC 94, and supplies an added result to the adder 81.

In a state where the tracking servo is ON, the switches 82 and 99 are closed in response to control signals from the controller 88. Thus, the outputs of the phase compensation circuits 79 and 95 are supplied to the adder 81, thereby forming a tracking servo loop. In this state where the tracking servo is ON, the DAC 94 is controlled by the controller 88 so as not to generate an output. Accordingly, when the tracking servo is ON, the output of the adder 80 is supplied to the driver 85 via the phase compensation circuit 79, the switch 82 and the adder 81. Furthermore, the output of the adder 97 is supplied to the driver 85 via the phase compensation circuit 95, the gain adjusting circuit 96, the switch 99, the adder 98 and the adder 81.

On the other hand, in a state where the tracking servo is OFF, the switches 82 and 99 are open in response to control signals from the controller 88, and no tracking servo loop is formed. Hence, only the output of the DAC 94 is supplied to the adder 81.

Therefore, when the tracking servo is OFF, the output of the DAC 94 is supplied to the driver 85, so as to control the position of the spot formed on the optical disk by the operation of the tracking actuator 86. In addition, the controller 88 detects an on-track (or exact track) position based on the output of the optical head 1.

In this embodiment, the controller 88 controls the gain adjusting circuits 73, 91 and 96 so that the gains of the gain adjusting circuits 73, 91 and 96 are respectively set to a corresponding first value when the mode set command MC specifies the normal operation mode, and are set to a corresponding second value smaller than the corresponding first value when the mode set command MC specifies the power save mode. Further, the controller 88 controls the phase compensation circuit 95 so that the phase compensation characteristic of the phase compensation circuit 95 is set to a first characteristic when the mode set command MC specifies the normal operation mode, and is set to a second characteristic different from the first characteristic when the mode set command MC specifies the power save mode.

The combined phase characteristic of the gain adjusting circuits 91 and 96 and the phase compensation circuit 95 within the tracking servo system and the combined gain characteristic of the gain adjusting circuits 91 and 96 may be set similarly as described above in conjunction with FIG. 5A. When the operation mode of the optical disk unit is switched from the normal operation mode to the power save mode and the combined gain of the gain adjusting circuits 91 and 96 is switched from $G_c$ to $G_c'$ in FIG. 5B, the phase characteristic of the phase compensation circuit 95 changes from $\Theta$ to $\Theta'$ as shown in FIG. 5B. For this reason, the combined phase characteristic is also switched from $\Theta_c$ to $\Theta_{c'}$.

Accordingly, even when the zero-crossing point of the combined gain G' of the gain adjusting circuits 91 and 96 shifts to a frequency $f_L$ in the open loop characteristic shown in FIG. 5A, the phase margin of the phase characteristic $\Theta'$ at this frequency $f_L$ is maintained to approximately $\Theta_m$, and it is possible to prevent the phase margin from becoming less than $\Theta_m$ as was the case of the conventional optical disk unit. For this reason, the stability of the tracking servo is ensured, and it is possible to prevent the tracking servo from easily falling outside the controllable range in response to external disturbances. It is also possible to positively prevent considerable increase in the power consumption caused by an oscillation generated in the tracking servo system.

In order to simultaneously switch the value of the gain of the gain adjusting circuit 91 and switch the phase compensation characteristic of the phase compensation circuit 95 and to also control the open loop characteristic to a desired characteristic, the circuit control becomes slightly complicated due to the need to simultaneously control two circuits. Hence, in the modification of this embodiment, the gain of the gain adjusting circuit 91 is set to the same value for both the normal operation mode and the power save mode, and the gain and the phase compensation characteristic of the phase compensation circuit 95 are both controlled simultaneously. In this case, it is only necessary to control one circuit, thereby simplifying the circuit control and facilitating a more accurate control.

In other words, in the modification of this embodiment, the controller 88 controls the gain adjusting circuit 91 so that the gain of the gain adjusting circuit 91 is set to a third value when the mode set command MC specifies the normal operation mode, and the gain of the gain adjusting circuit 91 is also set to the third value when the mode set command MC specifies the power save mode. In addition, the controller 88 controls the phase compensation circuit 95 so that the phase compensation characteristic of the phase compensation circuit 95 is set to the first characteristic and the gain of the phase compensation circuit 95 is set to the first value when the mode set command MC specifies the normal operation mode, and the phase compensation characteristic of the phase compensation circuit 95 is set to a second phase compensation characteristic different from the first characteristic and the gain of the phase compensation circuit 95 is set to a second value smaller than the first value when the mode set command MC specifies the power save mode.

Of course, the constructions of the focus servo system and the tracking servo system are not limited to those of the embodiment described above, and the present invention is similarly applicable to any focus servo system and tracking servo system having a gain adjusting circuit and a phase compensation circuit. In addition, it is also possible to simultaneously switch the characteristics of the phase compensation circuits of both the focus servo system and the tracking servo system based on the switching of the gains of the gain adjusting circuits within the focus servo system and the tracking servo system depending on the operation mode of the optical disk unit.

Further, the present invention is not limited to these embodiments, but various variations and modifications may be made without departing from the scope of the present invention.

What is claimed is:

1. A pickup control method for controlling a pickup of a reproducing unit which reproduces information from a recording medium, said pickup control method comprising the steps of:

(a) controlling a gain of a tracking error signal in a tracking servo system during a power save mode of the reproducing unit so that the gain is reduced in the power save mode in which the reproducing unit operates at a reduced power consumption compared to a normal operation mode, said tracking servo system controlling tracking of the pickup based on the tracking error signal so that the pickup follows a track on the recording medium; and (b) controlling a phase characteristic of a phase compensation means, provided in the tracking servo system, for compensating a phase of the tracking error signal so as to secure a phase margin at a zero-crossing point of the gain in an open loop characteristic of the tracking servo system during the power save mode.

2. The pickup control method as claimed in claim 1, which further comprises the steps of:

(c) automatically switching an operation mode of the reproducing unit to the power save mode when no access is made to the recording medium for a predetermined time.

3. A pickup control method for controlling a pickup of a reproducing unit which reproduces information from a recording medium by use of a light beam, said pickup control method comprising the steps of:

(a) controlling a gain of a focus error signal in a focus servo system during a power save mode of the reproducing unit so that the gain is reduced in the power save mode in which the reproducing unit operates at a reduced power consumption compared to a normal operation mode, said focus servo system controlling focus of the pickup based on the focus error signal so that the light beam is focused at a track position on the recording medium; and (b) controlling a phase characteristic of a first phase compensation means, provided in the focus servo system, for compensating a phase of the focus error signal so as to secure a phase margin at a zero-crossing point of the gain in an open loop characteristic of the focus servo system during the power save mode.

4. The pickup control method as claimed in claim 3, which further comprises the steps of:

(c) automatically switching an operation mode of the reproducing unit to the power save mode when no access is made to the recording medium for a predetermined time.

5. The pickup control method as claimed in claim 3, which further comprises the steps of:

(c) controlling a gain of a tracking error signal in a tracking servo system during the power save mode of the reproducing unit so that the gain is reduced in the power save mode, said tracking servo system controlling tracking of the pickup based on the tracking error signal so that the pickup follows a track on the recording medium; and (d) controlling a phase characteristic of a second phase compensation means, provided in the tracking servo system, for compensating a phase of the tracking error signal so as to secure a phase margin at a zero-crossing point of the gain in an open loop characteristic of the tracking servo system during the power save mode.

6. A pickup control apparatus for controlling a pickup of a reproducing unit which reproduces information from a recording medium, said pickup control apparatus comprising:

a tracking servo system controlling tracking of the pickup based on a tracking error signal so that the pickup follows a track on the recording medium;

gain adjusting means, provided in said tracking servo system, for adjusting a gain of the tracking error signal;

means for controlling the gain of said gain adjusting means so that the gain is switched between a normal operation mode and a power save mode of the reproducing unit, said reproducing unit in the power save mode operating at a reduced power consumption compared to the normal operation mode;

phase compensation means, provided in said tracking servo system, for compensating a phase of an output of said gain adjusting means; and phase characteristic control means for controlling a phase characteristic of said phase compensation means so that the phase characteristic is switched between the normal operation mode and the power save mode.

7. The pickup control apparatus as claimed in claim 6, wherein said phase characteristic control means maintains a phase margin at a zero-crossing point of the gain in an open loop characteristic of said tracking servo system approximately constant during the normal operation mode in which an access is made to the recording medium and the power save mode.

8. The pickup control apparatus as claimed in claim 6, which further comprises:

means for automatically switching an operation mode of the reproducing unit to the power save mode when no access is made to the recording medium for a predetermined time.

9. A pickup control apparatus for controlling a pickup of a reproducing unit which reproduces information from a recording medium by use of a light beam, said pickup control apparatus comprising:

a focus servo system controlling focus of the pickup based on a focus error signal so that the light beam is focused at a track position on the recording medium;

first gain adjusting means, provided in said focus servo system, for adjusting a gain of the focus error signal;

means for controlling the gain of said first gain adjusting means so that the gain is switched between a normal operation mode and a power save mode of the reproducing unit, said reproducing unit in the power save mode operating at a reduced power consumption compared to the normal operation mode;

first phase compensation means, provided in said focus servo system, for compensating a phase of an output of said first gain adjusting means; and first control means for controlling a phase characteristic of said first phase compensation means so that the phase characteristic is switched between the normal operation mode and the power save mode.

10. The pickup control apparatus as claimed in claim 9, wherein said first control means maintains a phase margin at a zero-crossing point of the gain in an open loop characteristic of said focus servo system approximately constant during the normal operation mode in which an access is made to the recording medium and the power save mode.

11. The pickup control apparatus as claimed in claim 9, which further comprises:

means for automatically switching an operation mode of the reproducing unit to the power save mode when no access is made to the recording medium for a predetermined time.

12. The pickup control apparatus as claimed in claim 9, which further comprises:

a tracking servo system controlling tracking of the pickup based on a tracking error signal so that the pickup follows a track on the recording medium;

second gain adjusting means, provided in said tracking servo system, for adjusting a gain of the tracking error signal;

means for controlling the gain of said second gain adjusting means so that the gain is switched between the normal operation mode and the power save mode of the reproducing unit;

second phase compensation means, provided in said tracking servo system, for compensating a phase of an output of said second gain adjusting means; and second control means for controlling a phase characteristic of said second phase compensation means so that the phase characteristic is switched between the normal operation mode and the power save mode.

13. The pickup control apparatus as claimed in claim 12, wherein said second control means maintains a phase margin at a zero-crossing point of the gain in an open loop characteristic of said tracking servo system approximately constant during the normal operation mode in which an access is made to the recording medium and the power save mode.

14. The pickup control apparatus as claimed in claim 8, wherein said first gain adjusting means is provided within said first phase compensation means.

15. The pickup control apparatus as claimed in claim 12, wherein said second gain adjusting means is provided within said second phase compensation means.

16. A disk unit comprising:

a pickup reproducing information from a disk;

a tracking servo system controlling tracking of the pickup based on a tracking error signal so that the pickup follows a track on the disk;

gain adjusting means, provided in said tracking servo system, for adjusting a gain of the tracking error signal;

means for controlling the gain of said gain adjusting means so that the gain is switched between a normal operation mode and a power save mode of the disk unit, said disk unit in the power save mode operating at a reduced power consumption compared to the normal operation mode;

phase compensation means, provided in said tracking servo system, for compensating a phase of an output of said gain adjusting means; and phase characteristic control means for controlling a phase characteristic of said phase compensation means so that the phase characteristic is switched between the normal operation mode and the power save mode, and for maintaining a phase margin at a zero-crossing point of the gain in an open loop characteristic of said tracking servo system during the power save mode.

17. The pickup control apparatus as claimed in claim 16, which further comprises:

means for automatically switching an operation mode of the disk unit to the power save mode when no access is made to the disk for a predetermined time.

18. A disk unit comprising:

a pickup reproducing information from a disk using a light beam;

a focus servo system controlling focus of the pickup based on a focus error signal so that the light beam is focused at a track position on the disk;

first gain adjusting means, provided in said focus servo system, for adjusting a gain of the focus error signal;

means for controlling the gain of said first gain adjusting means so that the gain is switched between a normal operation mode and a power save mode of the disk unit, said disk unit in the power save mode operating at a reduced power consumption compared to the normal operation mode;

first phase compensation means, provided in said focus servo system, for compensating a phase of an output of said first gain adjusting means; and first control means for controlling a phase characteristic of said first phase compensation means so that the phase characteristic is switched between the normal operation mode and the power save mode, and for maintaining a phase margin at a zero-crossing point of the gain in an open loop characteristic of said focus servo system during the power save mode.

19. The pickup control apparatus as claimed in claim 18, which further comprises:

means for automatically switching an operation mode of the disk unit to the power save mode when no access is made to the disk for a predetermined time.

20. The disk unit as claimed in claim 18, which further comprises:

a tracking servo system controlling tracking of the pickup based on a tracking error signal so that the pickup follows a track on the disk;

second gain adjusting means, provided in said tracking servo system, for adjusting a gain of the tracking error signal;

means for controlling the gain of said second gain adjusting means so that the gain is switched between the normal operation mode and the power save mode of the disk unit;

second phase compensation means, provided in said tracking servo system, for compensating a phase of an output of said second gain adjusting means; and second control means for controlling a phase characteristic of said second phase compensation means so that the phase characteristic is switched between the normal operation mode and the power save mode, and for maintaining a phase margin at a zero-crossing point of the gain in an open loop characteristic of said tracking servo system during the power save mode.

21. The disk unit as claimed in claim 18, wherein said first gain adjusting means is provided within said first phase compensation means.

22. The disk unit as claimed in claim 20, wherein said second gain adjusting means is provided within said second phase compensation means.

* * * * *

UNITED STATES PATENT AND TRADEMARK OFFICE
CERTIFICATE OF CORRECTION

PATENT NO. : 5,715,218
DATED : February 3, 1998
INVENTOR(S) : Toru Ikeda

It is certified that error appears in the above-identified patent and that said Letters Patent is hereby corrected as shown below:

Column 6, line 29, delete "Save" and insert --save-- therefor

Column 8, line 4, delete "Ell" and insert --E11-- therefor

Column 10, line 8, delete "ES" and insert --E8-- therefor

Column 10, line 10, delete "ES" and insert --E8-- therefor

Column 10, line 13, delete "at" and insert --a-- therefor

UNITED STATES PATENT AND TRADEMARK OFFICE
CERTIFICATE OF CORRECTION

PATENT NO. : 5,715,218
DATED : February 3, 1998
INVENTOR(S) : Toru Ikeda

It is certified that error appears in the above-identified patent and that said Letters Patent is hereby corrected as shown below:

Column 11, line 36, delete "so that"

Column 12, line 18, delete "0N" and insert

--ON-- therefor

Column 13, line 47, delete "AO" and insert

--A0-- therefor

Column 13, line 50, delete "unit is the power" (First occurrence) and insert   --the optical disk-- therefor

Signed and Sealed this

Fifteenth Day of September, 1998

Attest:

BRUCE LEHMAN

*Attesting Officer*          *Commissioner of Patents and Trademarks*